United States Patent
Smith

(10) Patent No.: US 8,528,605 B2
(45) Date of Patent: Sep. 10, 2013

(54) METHOD OF PRODUCING A COATING COMPOSITION

(75) Inventor: Martin James Smith, Slough (GB)

(73) Assignee: Imperial Chemical Industries Limited, London (GB)

( * ) Notice: Subject to any disclaimer, the term of this patent is extended or adjusted under 35 U.S.C. 154(b) by 1047 days.

(21) Appl. No.: 11/573,977

(22) PCT Filed: Jun. 27, 2006

(86) PCT No.: PCT/EP2006/006216
§ 371 (c)(1),
(2), (4) Date: Feb. 3, 2009

(87) PCT Pub. No.: WO2007/017010
PCT Pub. Date: Feb. 15, 2007

(65) Prior Publication Data
US 2009/0126826 A1    May 21, 2009

(30) Foreign Application Priority Data
Jul. 25, 2005 (GB) .................................... 0515179.0

(51) Int. Cl.
*B65B 1/04* (2006.01)
*B01F 13/10* (2006.01)

(52) U.S. Cl.
CPC .................................. *B01F 13/1055* (2013.01)
USPC ................. 141/9; 141/83; 141/100; 141/104; 141/105

(58) Field of Classification Search
USPC ................ 141/9, 83, 100–105; 222/144, 318
See application file for complete search history.

(56) References Cited

U.S. PATENT DOCUMENTS

| 5,268,849 A * | 12/1993 | Howlett et al. ............... 700/226 |
| 5,305,917 A * | 4/1994 | Miller et al. .................... 222/63 |
| 5,934,513 A * | 8/1999 | Bellas ........................... 222/144 |
| 5,985,987 A * | 11/1999 | Adolfsson et al. ............ 524/593 |
| 6,488,760 B1 * | 12/2002 | Binns et al. .................... 106/499 |
| 6,769,462 B2 * | 8/2004 | Larson et al. ................... 141/83 |
| 6,935,386 B2 * | 8/2005 | Miller et al. .................... 141/18 |
| 6,991,004 B2 * | 1/2006 | Kaufhold et al. ............... 141/83 |
| 7,250,464 B2 * | 7/2007 | Friel et al. ..................... 524/497 |
| 7,339,000 B1 * | 3/2008 | McClain et al. ............... 524/495 |
| 2003/0019537 A1 | 1/2003 | Taylor et al. |
| 2004/0059041 A1 | 3/2004 | McClain et al. |
| 2004/0250873 A1 | 12/2004 | Taylor et al. |

FOREIGN PATENT DOCUMENTS

| EP | 0427497 | 5/1991 |
| EP | 0614951 | 9/1994 |
| EP | 1125643 | 8/2001 |

OTHER PUBLICATIONS

International Search Report, PCT/EP2006/006216, mailed Sep. 20, 2006, 3 pages.

* cited by examiner

*Primary Examiner* — Timothy L Maust
(74) *Attorney, Agent, or Firm* — Kenyon & Kenyon LLP

(57) ABSTRACT

A method of producing a coating composition in an in-store tinting machine comprising the steps of selecting a base paint, adding at least one additive to the base paint, adding at least one colorant to the base paint, the at least one colorant being selected from a range of colorants in the in-store tinting machine, mixing the base paint, the at least one colorant, and the at least one additive so as to produce a coating composition, in which the additive is not a base paint or a colorant from the range of colorants in the in-store tinting machine.

11 Claims, 3 Drawing Sheets

METHOD OF PRODUCING A COATING COMPOSITION

CROSS-REFERENCE TO RELATED APPLICATIONS

This application is the national phase under 35 U.S.C. §371 of PCT International Application No PCT/EP/2006/006216 having an international tiling date of Jun. 27, 2006 entitled "A METHOD OF PRODUCING A COATING COMPOSITION", which was filed in the English language and which designated the United States of America, and which claims the benefit of priority to Great British Patent Application No. 0515179, filed on Jul. 25, 2005. This application also claims the benefit of provisional patent application Ser. No. 60/728,119 filed Oct. 19, 2005 entitled "A METHOD OF PRODUCING A COATING COMPOSITION". The disclosure of all of these applications is hereby incorporated in their entirety by reference.

The present invention relates to a method of producing a coating composition in an in-store tinting machine, and an in-store tinting machine system.

Paint or similar coating compositions such as lacquers, varnishes or wood stains, is used by both the skilled professional decorator and the relatively unskilled do-it-yourself painter for a variety of reasons. Typically, these are to brighten up the surroundings and/or to match the colour of a particular item of furniture, floor or wall covering, and other surfaces found in buildings. As consumers have become increasingly sophisticated and individual in their choice of colours, the demand for a wider range of colours has also increased.

This presents a problem to the paint manufacturer and the retailer or trade store keeper as the former has to produce many colours in small amounts, thus losing the economies of scale and, of course the retailer or store keeper has to provide additional space to store and display this plurality of coloured paints. A typical paint would be architectural paint used on site at ambient temperatures.

Some paint manufacturers have addressed this problem by developing tinting Machines. These operate on the basis that a variety of colours can be made by adding colourant to a factory produced base paint at the retailer's premises. Such machines are referred to as 'in-store' tinting machines. For the avoidance of doubt, the term 'in-store' relates to small trade stores and retail outlets, in contrast to producing such coating compositions in a paint processing plant. A small number of different coloured base paints, comprising three or four spanning the range of light to deep shades, is provided by the supplier to the retailer, in cans. Such a base paint is unfinished from the point of view of the final colour.

The colourant to be added is usually in the form of pigments, pigment concentrates, tinters or dyes. Usually, about twenty such colourants are required to produce a significant colour range of paints, although only frequently three or four are required to produce any given colour. The colourants are added to the base paint according to a predetermined recipe, being one of many, stored in a computer. The recipe also indicates which of the base paints should be selected for tinting in order to produce the required colour.

Such tinting machines typically comprise a number of storage vessels containing the colourants, a means of delivering the colourant to the can of base paint, for example by one or more manual or automated piston or gear pumps, storage means for the collection of recipes, and control means (manual and/or computerised) for controlling the delivery of colourant in accordance with the selected recipe. The control means may, for example, control the addition of colourant by governing the traverse of pistons in pumps or by activating the pumps for a predetermined time period so that a predetermined volume of colourant is delivered in accordance with the recipe for the selected colour. In this way varying amounts of each colourant may be added to the selected base paint enabling paints of a variety of alternative colours to be produced. Finally, the base paint and added colourant are subjected to mixing, usually by intense shaking, to obtain a homogeneous mixture of base paint and colourant with even colour.

Thus it will be appreciated that the number of different colours that can be produced is determined by the number of different colourants present in the tinting machine, and the number of different base paints, and increasing either will enable a greater number of different colours to be produced.

The number of colourants in the tinting machine is typically fixed, and therefore, in known methods of tinting base paints, the only means by which the number of different colours can be increased is to increase the number of different stocked base paints, which in turn leads to more storage area being required. Thus a balance has to be achieved between the number of coating compositions available to the consumer and the quantity of stocked base paints.

Another problem associated with in-store tinting machines is not being able to modify characteristics of the coating composition for different customer requirements, for example, adding particulate solid to give texture. To enable a textured paint to be produced it would be necessary to supply an additional base paint which includes the texture addition, again requiring further storage.

An object of the present invention is to increase the number of different colours that can be produced and/or enable the characteristics of the coating composition to be modified without having to increase the number of different stocked base paints.

Thus according to the present invention there is provided a method of producing a coating composition in an in-store tinting machine comprising the steps of selecting a base paint, adding at least one additive to the base paint, adding at least one colourant to the base paint, the at least one colourant being selected from a range of colourants in the in-store tinting machine, mixing the base paint, the at least one colourant, and the at least one additive so as to produce a coating composition, in which the additive is not a base paint or a colourant from the range of colourants in the in-store tinting machine.

By adding an additive to the base paint it is possible to increase the different number of colours of coating compositions that can be produced for the same number of base paints and/or enable the characteristics of the coating composition to be modified. This is possible because the addition of the additive to the base paint in effect doubles the number of base paints available.

Alternatively, for the same number of colours of coating compositions, the effective increase in the number of base paints by the addition of the additives means that less base paints need to be stocked, and since the additives require less space than the base paints, the space requirement in the store is reduced.

The invention will now be described by way of example only, with reference to the accompanying drawings, in which.

Figure 1:
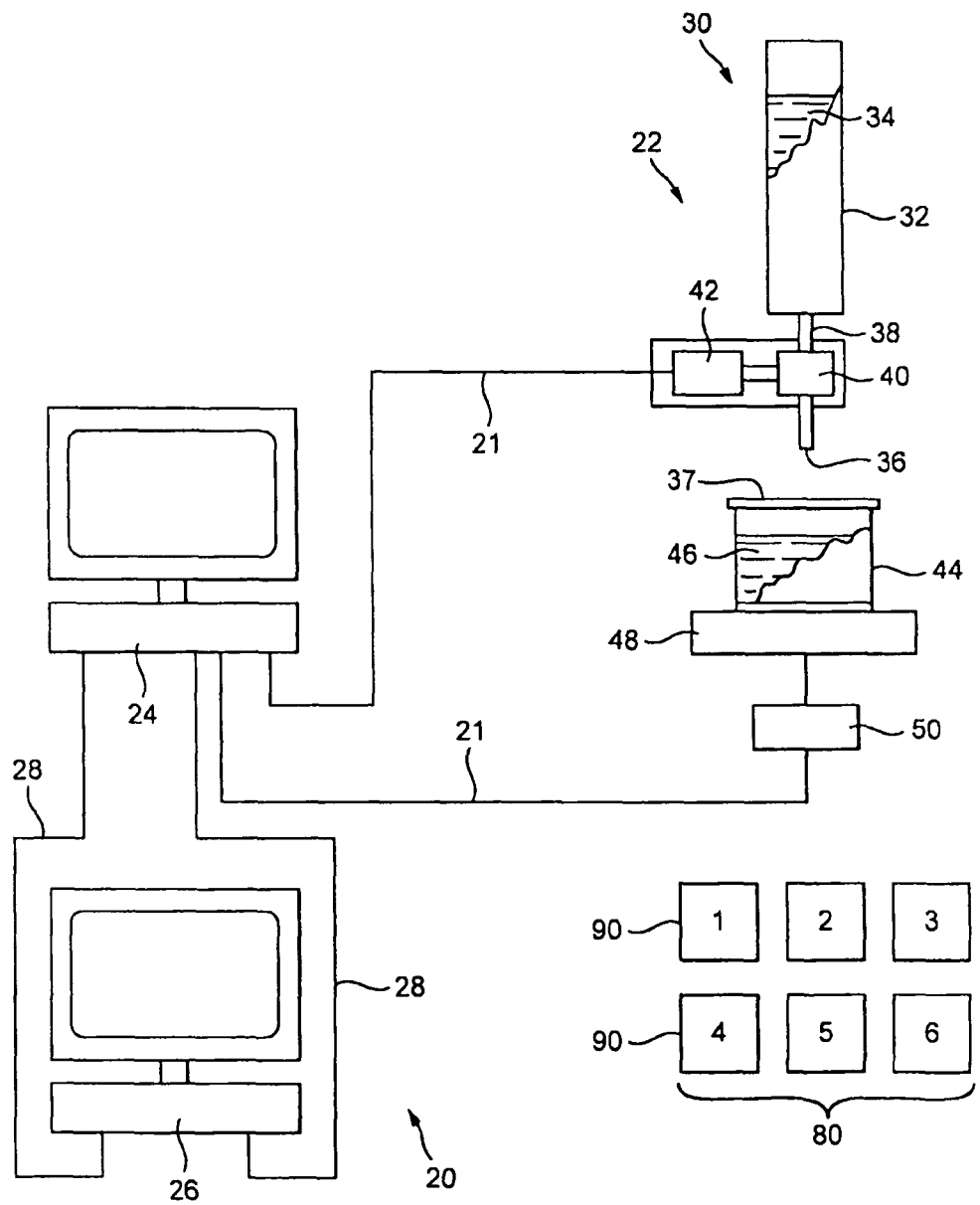
FIG. 1 is a diagrammatic representation of a tinting machine.
Figure 2:
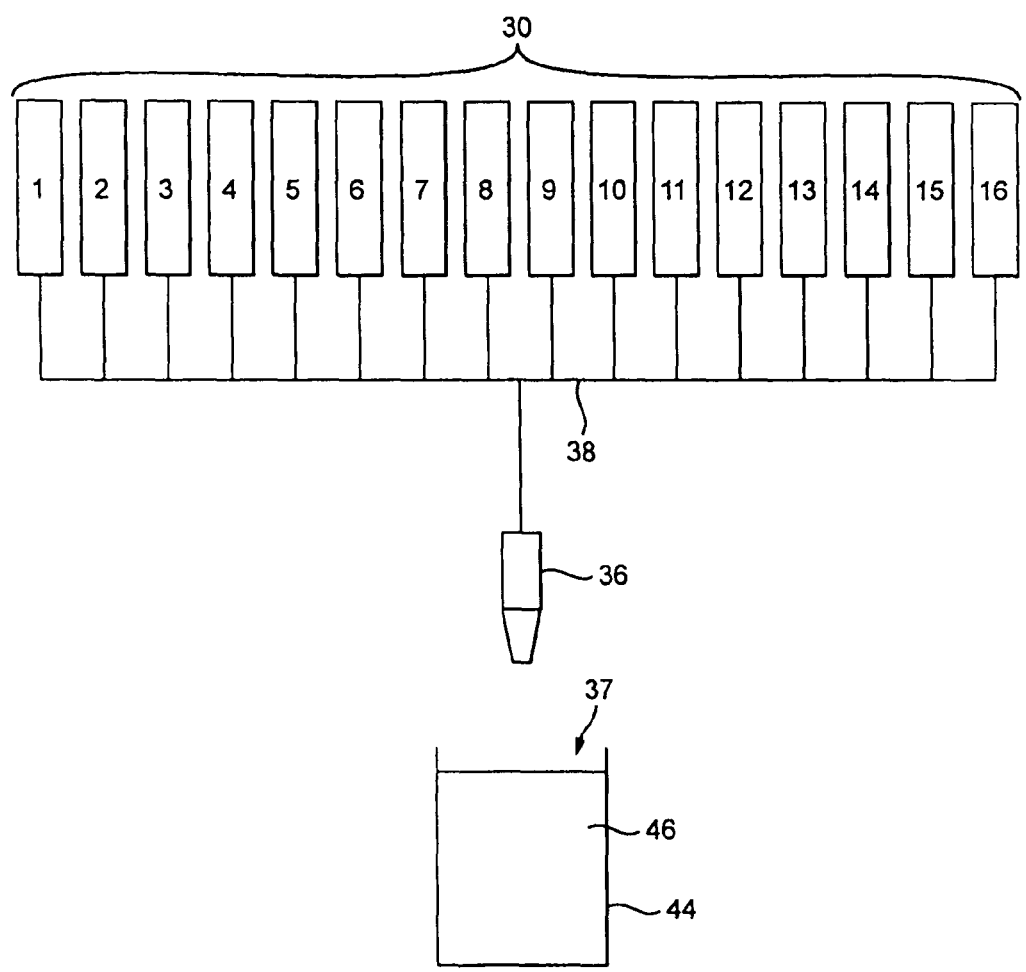
FIG. 2 is a schematic representation of the colourant dispenser system of the tinting machine of FIG. 1.

With reference to FIGS. 1 and 2 there is shown a known tinting machine system 20.

The tinting machine 22 is an in-store tinting machine, typically used in retail store outlets to enable consumers to purchase tinted coating compositions. Paint containers of all sizes are used, typically those sizes used by consumers when purchasing paint that is not mixed in store. However, the size of the container is not limited to such sizes, but to sizes which are capable of being prepared in an in-store tinting machine. It is also to be understood that tinting machines also includes machines that are located in environments not accessible by the consumer, for example, in a contractor's warehouse.

A personal computer 24 stores a collection of colour recipes which includes information indicating which base paint to select for tinting, the amount of each colourant addition to be made, the amount of additive to be added, and the final weight of the container of tinted paint for each tinted coating composition. The amount of colourant addition may foe by weight or volume. The colours may be identified by name, code or cypher or combinations thereof, for example British Standard or RAL names or codes, NCS (Natural colour System), NCS2, or "Dulux" "Colour Palette" cyphers. The collection of colour recipes can be recorded in various forms including a compilation or a database. Preferably they are recorded systematically or methodically and are individually accessible to form a database which enables additions and deletions to be more readily made. In this embodiment, the collection of recipes can be stored directly onto the hard drive of the personal computer 24, alternatively other storage means, such as floppy disks, optical disks such as a CD-ROM and Digital Versatile Disk (DVD) may be used.

The personal computer 24 also has software installed which enables both control of the tinting machine 22, and analysis of the weights of the dispensed tinted coating composition. The personal computer 24 is further connected to a video display 25 to which messages can be signalled and displayed.

In this embodiment, the personal computer 24 is directly connected to the tinting machine 22 via a cable 21. In an alternative embodiment, the personal computer may stand alone, in which case it may communicate with the tinting machine from a remote location via a phone line, across a network, or any other suitable connection.

The tinting machine 22 includes sixteen colourant dispenser systems 30 (only one of which is shown in FIG. 1). Each colourant dispenser system 30 includes a storage vessel 32 which contains colourant 34. FIG. 2 shows that each of the colourant dispenser systems 30 (numbered 1 to 16) is connected to a common dispensing nozzle 36 via pipework 38. Each colourant dispenser system 30 includes a pump 40 which is driven by an actuator in the form of a stepper motor 42. Each stepper motor 42, and thus the dispensing of individual colourants 34, is controlled by the first personal computer 24. To dispense the re amount of colourant for the particular coating composition, the stepper motor 42 is operated so as to turn the pump 40 a specified number of turns. In this embodiment, the pumps and motors are identical for each colourant dispenser system. Alternatively, different sized pumps and motors could be used for each colourant dispenser system depending on the requirement of that system.

In this embodiment, the addition of colourant to the base paint is carried out using a pump driven by a stepper motor. In other embodiments a piston type arrangement may be used instead of a pump, or a syringe driven by a motor. Stepper motors are preferred as they can be accurately controlled thereby delivering precise quantities of colourant via the pump. Alternatively, a standard motor and an encoder can perform the same function as the stepper motor.

In this embodiment, where more than one colourant is required to achieve the tinted coating composition the colourants are added substantially simultaneously so as to reduce the overall dispensing time. In an alternative system, the colourants can be added sequentially, i.e., one after the other.

Whilst in this embodiment sixteen colourants are used, any number of colourants may be used, although typically, between nine and thirty two colourants are used. Increasing the number of colourants may increase the number of tints available, but will add to the complexity of the tinting machine.

Suitable colourants include pigments, pigment concentrates and dyes. Pigment concentrates generally comprise high levels of pigment, dispersed in a carrier liquid, optionally with the aid of dispersant. The carrier liquid may be an organic solvent or water or mixtures thereof. Solutions of dyes in appropriate solvents or undiluted dyes are also useful. Pigment concentrates are preferred for paints as they provide better hiding power than dyes. It is to be understood that the present invention can use any suitable colourants or earner liquids, and is not limited to those examples given. Other examples include water based pigment dispersions, or resin based pigment dispersions carried in solvents.

FIGS. 1 and 2 shows a base paint container 44 part cut away to reveal that it is almost fully filled with base paint 46 situated on weighing means in the form of a load cell 48. The load cell 48 is connected to an analogue to digital converter (ADC) 50, which signals in digital format any weight registered by the bad cell 48 to the first personal computer 24.

A load cell is a device which produces an output signal proportional to the applied weight or force when that weight or force is within the range of operation of that device. Load cells are the preferred form of weighing means for this application since they are better able to register a wide range of weights accurately. This is important since light colours require a small addition of colourant to the base paint, and deep colours typically require significantly more colourant to be added. However, other weighing means are also envisaged which are similarly able to register such a wide range of weight accurately.

The nozzle 36 is located vertically above open mouth 37 of the container so that additions of colourant can be conveniently made to the base paint.

The base paint 46 typically comprises all the necessary components of a coating composition including pigment, binder, earner liquid, solvent, dispersant, antifoam, coalescing aid and other additives typically found in coating compositions. The base paint is distinguished from the final tinted coating composition mainly because it does not contain all of the required colourants to produce a specified colour contained in the collection of colour recipes. The number of base paints required for a particular product, for example a finish such as matt emulsion, ranges, typically, from one to eight is generally from three to eight, and preferably from four to six are used as this reduces the risk of selecting the wrong base paint for tinting whilst maintaining acceptable capability in producing the necessary range of colours.

It can also be seen front FIG. 1 that a selection of additives 80 in the form, of additional colourants numbered 1 to 6 are provided in containers 90.

Figure 3:
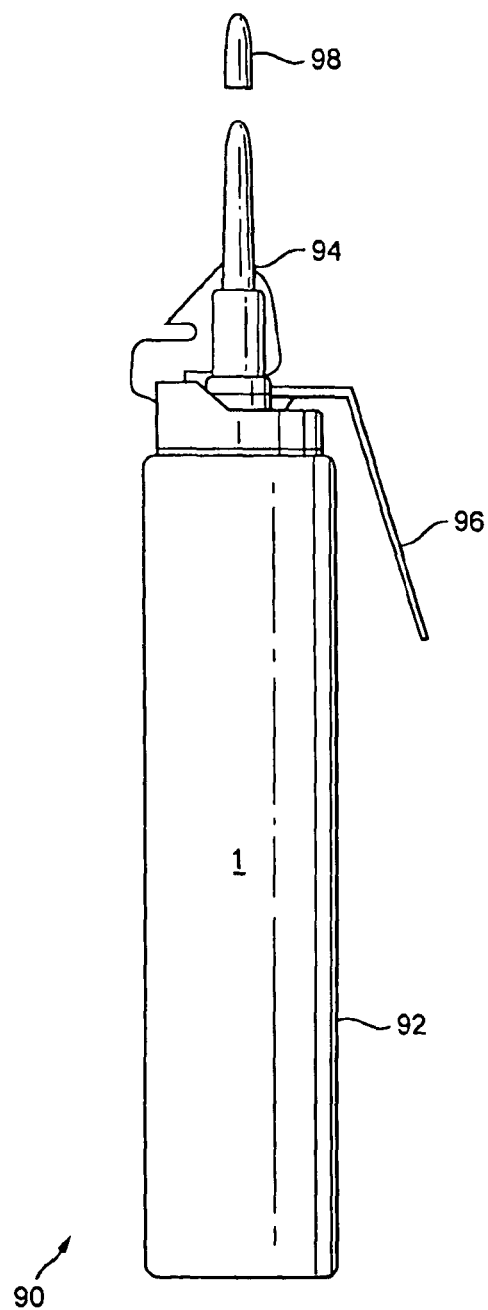
FIG. 3 is a front view of an additive container for use with the tinting machine of FIG. 1.

With reference to FIG. 3, one of the containers 90 is shown in more detail. The container 90 (supplied by Lindal Group) has a body 92 which receives the additive 1, a nozzle 94 which retains the additive in the body 92, a lever 96 which enables the additive to be dispensed into the base paint, and a cap 98 (shown removed) to seal off the nozzle 94. Other containers are also envisaged, the key requirement of the container being the ability to dispense the additive with the minimum of waste, and at a speed acceptable to the customer.

In an alternative embodiment the additives 80 need not be in the form of additional colourants, with additives such as texturisers, foaming agents, fungicides, rheology modifiers, pearl and similar effect additions, glass beads, opacifiers, transparent iron oxides, glitter, optical brighteners, surfactants, silicones, tougheners, or particulate solids envisaged.

Another useful additive is the use of a base paint modifier, which converts a particular type of base paint into another base paint thus enabling a base paint and the base paint modifier to take the place of two base paints. For example, the base paint modifier can be added to a base paint having a particular shade to create a different shade. This has the advantage of reducing the amount of shelf space required to stock base paints since the base paint modifier will take up less space than the base paint.

It will be appreciated that both the type of additive and the number of additives can vary depending on the requirements of the customer.

Typically the additives will be stocked in-store in the same area as the base paints. It will be appreciated that different types of additives can be stocked in the same store, for example, colourants and texturisers, again this being determined by the customer requirement.

The tinting machine system is operated as follows:

A consumer will firstly select a desired coating composition, typically, the tint (usually selected manually from colour cards), the sheen (for example matt, silk, or gloss), and the container volume, which is communicated to the machine operator. Each selection will have a code which corresponds to a particular colour recipe stored on the computer. The selection is inputted into the personal computer 24 by the machine operator, and the computer will determine firstly, which combination of colourants are required, and in what quantity for the selected container volume, secondly which base paint is required, and thirdly which additive and quantity is required.

In the case of a coating composition where the tint cannot be created using the colourants available in the tinting machine, the additive would be in the form of a colourant and therefore in effect, the tint would be made up of those colourants selected from the tinting machine, and those selected from the additives that are stocked remote from the tinting machine.

Additionally, or alternatively, a different additive can be added to modify the coating composition characteristics beyond creating a specific tint, for example, adding texture.

In another embodiment, the tinting machine could be a self-service machine where the selection is inputted directly by the consumer.

The machine operator will firstly select the correct base paint container 44, and remove the lid. The machine operator will then select the correct additive container 90, and dispense the additive into the base paint container by firstly removing the cap 98, twisting the nozzle 94, and then pressing the lever 96 to release the contents.

In this embodiment, the entire contents of the additive container 90 are dispensed into the base paint container 44. However, in other embodiments, the additive container can be regulated in such a way that not all of the contents needs to be dispensed. This would allow a controlled amount of colourant, or other additive to be added to the base paint container as required so as to alter the coating composition to varying degrees.

The machine operator will then position the base paint container 44 (which now includes the additive) under the dispensing nozzle 36, and then activate the tinting machine 22 via the personal computer 24 such that the stepper motor 42 drives the pump 40 of each appropriate colourant dispenser system 30, and dispenses the colourant 34 into the paint container 44 via nozzle 36 to produce a tinted coating composition. After all the colourants required have been dispensed, and the additives added, the container 44 is shaken to ensure a homogeneous mix of the colourant, base paint, and additive.

In an alternative embodiment the additive could be added to the base paint from a container which is integrated within the tinting machine, and not from a container which is stocked on shelves remote from the tinting machine as described above. This would have the advantage of negating the manual step of dispensing the additive into the base container. In such a system, the additive, and the colourant can be added to the base paint simultaneously to speed up the process.

Thus it can be seen that the present invention allows a coating composition to be selected by a customer which is made up of a base paint, at least one colourant from the tinting machine, and at least one additive. The possibility to add the additive to the base paint enables a greater number of different tints to be produced, and/or allows the coating composition to be modified depending on the consumer requirements without having to modify the tinting machine in any way. Thus a greater range of coating compositions can be offered to the consumer simply by providing a range of additives in addition to the base paints already stocked.

Conversely, if it is not deemed necessary to offer a greater range of coating compositions, then the number of base paints can be reduced by the use of the additives, since a single type of base paint can be modified with the use of an additive to provide a further base paint. The additive containers are typically smaller than the base paint containers (by virtue of the lower volume of the contents), and therefore this substitution frees up more shelf space in the store.

In certain circumstances, the particular coating composition selected by the consumer may not require the use of an additive, for example, if the tint, only requires the colourants present in the tinting machine and an unmodified base paint. In this case, the coating composition is created as known previously.

In another circumstance, it could be that the particular tint can be created using the colourants on the tinting machine only, with a modified base paint created by mixing an additive with an unmodified base paint.

Clearly the advantage of the present invention is the flexibility afforded by the use of additives, and being able to address the issue of balancing shelf space with the range of coating compositions offered, without having to modify or replace the tinting machine.

A further, but not insignificant advantage of the present invention is the fact that colourants can be added to the base paints from the additive containers, and therefore, the use of the colourant dispensing system of the tinting machine will experience less wear.

The invention claimed is:

1. A method of producing a coating composition in an in-store tinting machine comprising the steps of:
    selecting a base paint,
    adding at least one additive to the base paint, adding at least one colorant to the base paint, the at least one colorant being selected from a range of colorants in the in-store tinting machine, mixing the base paint, the at least one colorant, and the at least one additive so as to produce a coating composition, in which the additive is not a base paint or a colorant from the range of colorants in the in-store tinting machine, and in which the at least one additive is added to the base paint manually and remote from the tinting machine, wherein the at least one additive is added to the base paint before the at least one colorant is added to the base paint.

2. A method according to claim 1 in which the at least one additive is stored in a container, and the entire contents of the container are dispensed into the base paint.

3. A method according to claim 2 in which the at least one additive and the at least one colorant are added to the base paint simultaneously.

4. A method according to claim 1 in which the at least one additive is a colorant, the at least one colorant being distinct from the at least one colorant in the in-store tinting machine.

5. A method according to claim 1 in which the at least one additive contains a texturizer and/or a foaming agent and/or a fungicide and/or a rheology modifier and/or particulate solid.

6. A method according to claim 1 in which the at least one additive is a base paint modifier.

7. A method according to claim 1 in which the at least one additive is added to the base paint manually and wherein the additive is selected from at least one colorant that is distinct from the at least one colorant in the in-store tinting machine or at least one additive comprising a texturizer or at least one additive comprising a foaming agent or at least one additive comprising a fungicide or at least one additive comprising a rheology modifier or at least one additive comprising a particulate solid or at least one additive that is a base paint modifier or any combination of at least two of these.

8. A method according to claim 1 in which the at least one additive is stored in a container, and the entire contents of the container are dispensed into the base paint, and wherein the additive is selected from at least one colorant that is distinct from the at least one colorant in the in-store tinting machine or at least one additive comprising a texturizer or at least one additive comprising a foaming agent or at least one additive comprising a fungicide or at least one additive comprising a rheology modifier or at least one additive comprising a particulate solid or at least one additive that is a base paint modifier or any combination of at least two of these.

9. A method according to claim 1 in which the at least one additive is added to the base paint remote from the tinting machine, and wherein the additive is selected from at least one colorant that is distinct from the at least one colorant in the in-store tinting machine or at least one additive comprising a texturizer or at least one additive comprising a foaming agent or at least one additive comprising a fungicide or at least one additive comprising a rheology modifier or at least one additive comprising a particulate solid or at least one additive that is a base paint modifier or any combination of at least two of these.

10. A method according to claim 1 in which the at least one additive is added to the base paint before the at least one colorant is added to the base paint, and wherein the additive is selected from at least one colorant that is distinct from the at least one colorant in the in-store tinting machine or at least one additive comprising a texturizer or at least one additive comprising a foaming agent or at least one additive comprising a fungicide or at least one additive comprising a rheology modifier or at least one additive comprising a particulate solid or at least one additive that is a base paint modifier or any combination of at least two of these.

11. A method according to claim 1 in which the at least one additive is stored in a container, integral with the in-store tinting machine, and the entire contents of the container are dispensed into the base paint and wherein the at least one additive is added to the base paint manually, and wherein the additive is selected from at least one colorant that is distinct from the at least one colorant in the in-store tinting machine or at least one additive comprising a texturizer or at least one additive comprising a foaming agent or at least one additive comprising a fungicide or at least one additive comprising a rheology modifier or at least one additive comprising a particulate solid or at least one additive that is a base paint modifier or any combination of at least two of these.

\* \* \* \* \*

UNITED STATES PATENT AND TRADEMARK OFFICE
CERTIFICATE OF CORRECTION

PATENT NO. : 8,528,605 B2
APPLICATION NO. : 11/573977
DATED : September 10, 2013
INVENTOR(S) : Martin James Smith It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1363 days.

Signed and Sealed this
Fifteenth Day of September, 2015

Michelle K. Lee
*Director of the United States Patent and Trademark Office*